(12) United States Patent
Mamtimin et al.

(10) Patent No.: US 12,135,402 B2
(45) Date of Patent: Nov. 5, 2024

(54) ALGORITHM-FREE, DATA-CENTRIC MULTIVARIATE INVERSION FOR PULSED NEUTRON LOGGING

(71) Applicant: Halliburton Energy Services, Inc., Houston, TX (US)

(72) Inventors: Mayir Mamtimin, Houston, TX (US); Jeffrey James Crawford, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 336 days.

(21) Appl. No.: 17/693,087

(22) Filed: Mar. 11, 2022

(65) Prior Publication Data

US 2023/0288602 A1  Sep. 14, 2023

(51) Int. Cl.
*G01V 5/10* (2006.01)
*G01V 5/04* (2006.01)

(52) U.S. Cl.
CPC .............. *G01V 5/102* (2013.01); *G01V 5/045* (2013.01)

(58) Field of Classification Search
CPC ............ G06N 3/09; G06N 3/08; G06N 3/063; G01V 5/102; G01V 5/045
See application file for complete search history.

(56) References Cited

U.S. PATENT DOCUMENTS

| | | | |
|---|---|---|---|
| 10,724,367 B2 | 7/2020 | Cao Minh | |
| 11,204,439 B2 | 12/2021 | Guo | |
| 2011/0202276 A1 | 8/2011 | Truax et al. | |
| 2013/0124094 A1 | 5/2013 | Galford | |
| 2015/0108339 A1 | 4/2015 | Guo et al. | |
| 2017/0058666 A1 | 3/2017 | Chen et al. | |
| 2017/0145821 A1 | 5/2017 | Hu et al. | |
| 2017/0199283 A1 | 7/2017 | Hu et al. | |
| 2017/0199298 A1 | 7/2017 | Hu et al. | |
| 2017/0211382 A1 | 7/2017 | Jacobson et al. | |
| 2017/0329041 A1 | 11/2017 | Zhang et al. | |
| 2018/0292204 A1 | 10/2018 | Lee et al. | |
| 2018/0329109 A1 | 11/2018 | Navarro Sorroche et al. | |
| 2018/0372906 A1 | 12/2018 | Hou et al. | |
| 2019/0219731 A1 | 7/2019 | Navarro-Sorroche et al. | |
| 2020/0199995 A1 | 6/2020 | Hu et al. | |
| 2021/0373193 A1 | 12/2021 | Mamtimin et al. | |
| 2021/0373194 A1 | 12/2021 | Mamtimin et al. | |
| 2021/0373195 A1 | 12/2021 | Mamtimin et al. | |

OTHER PUBLICATIONS

International Search Report and Written Opinion for Application No. PCT/US2022/021329, dated Nov. 29, 2022.

*Primary Examiner* — An H Do
(74) *Attorney, Agent, or Firm* — John Wustenberg; C. Tumey Law Group PLLC (57) ABSTRACT

A method and system for identifying one or more petrophysical properties in a formation. The method and system may include disposing a pulsed-neutron logging tool into a borehole that is disposed in a formation, emitting a neutron from a neutron source on the pulsed-neutron logging tool into the formation, and capturing one or more gammas expelled from formation in response to the neutron from the neutron source to form a plurality of pulsed neutron logging (PNL) measurements in a log. The method and system may further include comparing the log to a database with a cost function to form a solution; and identifying a plurality of petrophysical properties based at least in part on the solution.

18 Claims, 4 Drawing Sheets

ALGORITHM-FREE, DATA-CENTRIC MULTIVARIATE INVERSION FOR PULSED NEUTRON LOGGING

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility enhancement, production enhancement strategies, and reserve estimation. Petrophysical properties of a formation is additional information that may further drive strategies for hydrocarbon production. Petrophysical properties may comprise borehole size and casing size, tool position and standoff, borehole fluid content, casing and cement quality, formation lithology, formation porosity, formation oil saturation, holdup, and/or the like Generally, pulsed-neutron logging (PNL) tool is used to determine petrophysical properties of a formation. A PNL tool may operate and function by utilizing nuclear detectors to measure induced gammas by interaction of high energy neutrons that are emitted from a generator. Induced gamma measurements may include inelastic spectrum and capture spectrum. In examples, these measurements may allow for the determination petrophysical properties of a formation.

It is often challenging to find petrophysical properties simultaneously when using pulsed neutron logging tool. This is because the fast neutron interaction in borehole environment is complex, and its response function is a convoluted effect of all the aspects of borehole conditions. Traditionally, one or two petrophysical properties are isolated and correlated with PNL measurement via physics-based algorithm so that the response function may be inverted to solve for those variables. This often extends processing time and computational energy, which increases cost.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods for a tool-data-centric multivariate inversion. The inversion may iteratively solve for multiple variables of the borehole condition without the need for physics-based algorithm development when using a pulsed neutron logging (PNL) tool. As described below, PNL measurements may be compared to a database populated with simulated data using a cost function to identify a unique or non-unique solution.

Figure 1:
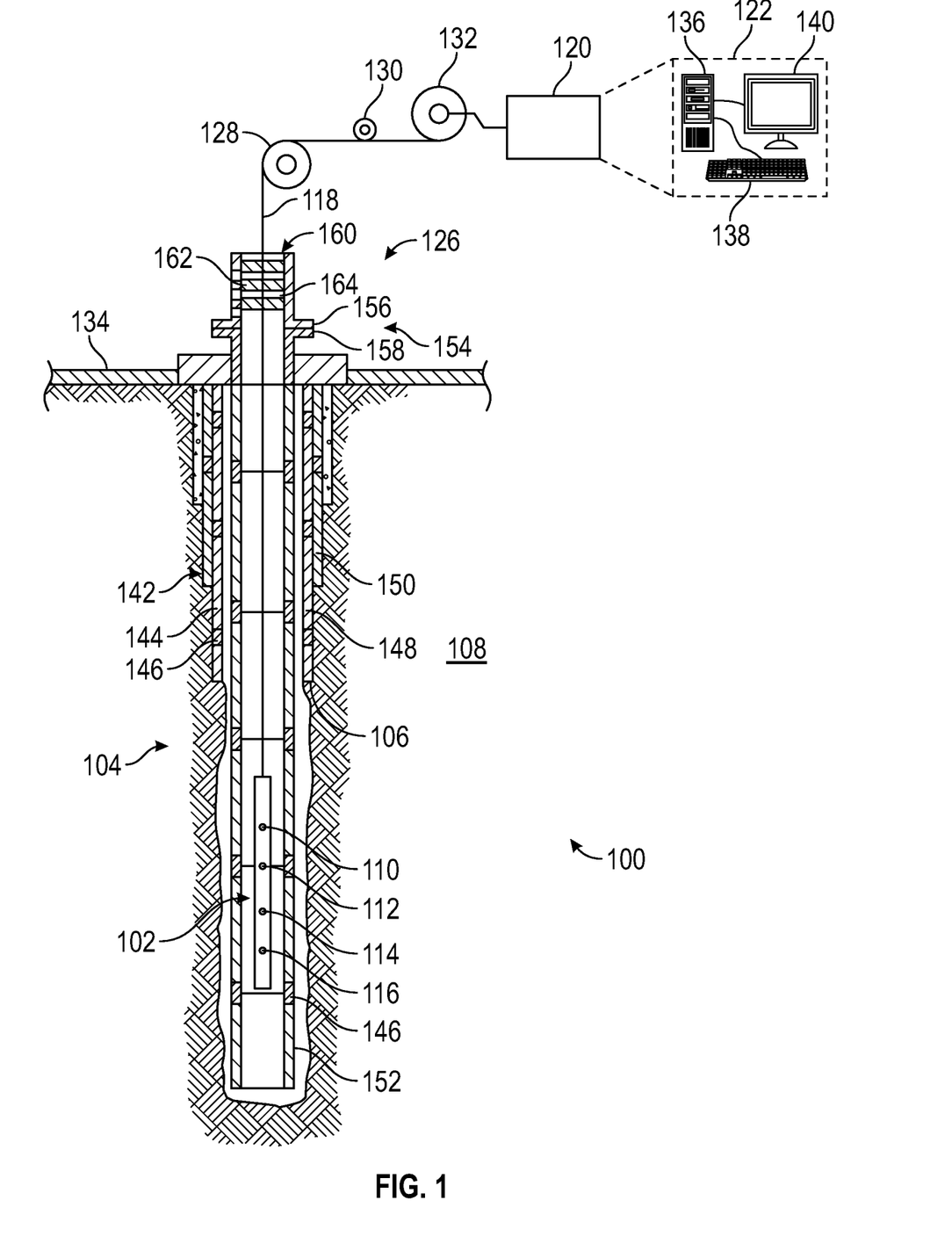
FIG. 1 illustrates a downhole tool in a wireline configuration, in accordance with examples of the present disclosure.

FIG. 1 illustrates logging/measuring operation 100, as disclosed herein, utilizing a pulsed-neutron logging tool 102. FIG. 1 illustrates a cross-section of borehole 104 with a pulsed-neutron logging tool 102 traveling through well casing 106. Borehole 104 may traverse through formation 108 as a vertical well and/or a horizontal well. Pulsed-neutron logging tool 102 contains a neutron source 110, a first neutron detector 112, a second neutron detector 114, and a gamma ray detector 116. Pulsed-neutron logging tool 102 is suspended by a conveyance 118, which communicates power from a logging facility 120 to pulsed-neutron logging tool 102 and communicates telemetry from pulsed-neutron logging tool 102 to information handling system 122. In examples, pulsed-neutron logging tool 102 may be operatively coupled to a conveyance 118 (e.g., wireline, slickline, coiled tubing, pipe, downhole tractor, and/or the like) which may provide mechanical suspension, as well as electrical connectivity, for pulsed-neutron logging tool 102. Conveyance 118 and pulsed-neutron logging tool 102 may extend within casing string 142 to a desired depth within borehole 104. Conveyance 118, which may include one or more electrical conductors, may exit wellhead 126, may pass around pulley 128, may engage odometer 130, and may be reeled onto winch 132, which may be employed to raise and lower the tool assembly in borehole 104. The position of pulsed-neutron logging tool 102 may be monitored in a number of ways, including an inertial tracker in pulsed-neutron logging tool 102 and a paid-out conveyance length monitor in logging facility 120 (e.g., an idler wheel on the wireline cable).

Multiple such measurements may be desirable to enable the system to compensate for varying cable tension and cable stretch due to other factors. Information handling system 122 in logging facility 120 collects telemetry and position measurements and provides position-dependent logs of measurements from pulsed-neutron logging tool 102 and values that may be derived therefrom.

Pulsed-neutron logging tool 102 generally includes multiple instruments for measuring a variety of downhole parameters. Wheels, bow springs, fins, pads, or other centralizing mechanisms may be employed to keep pulsed-neutron logging tool 102 near the borehole axis during measurement operations. During measurement operations, generally, measurements may be performed as pulsed-neutron logging tool 102 is drawn up inside at a constant rate. The parameters and instruments may vary depending on the needs of the measurement operation.

Pulsed-neutron logging tool 102 operates by generating pulses of high energy neutrons that radiate from neutron source 110 into the surrounding environment including borehole 104 and formation 108. The highly energetic neutrons entering the surrounding environment interact with atomic nuclei, inducing gamma radiation. The induced gamma rays may be recorded as a scattering rate (and hence the rate of energy loss) and are generally dominated by the concentration of hydrogen atoms. Induced gamma rays and neutrons may be recorded by first neutron detector 112, second neutron detector 114, and/or gamma ray detector 116.

Measurements taken by pulsed-neutron logging tool 102 may be gathered and/or processed by information handling system 122. For example, signals recorded by pulsed-neutron logging tool 102 may be sent to information handling system 122 where they may be stored on memory and then processed. The processing may be performed real-time during data acquisition or after recovery of pulsed-neutron logging tool 102. Processing may alternatively occur downhole on an information handling system 101 disposed on pulsed-neutron logging tool 102 or may occur both downhole and at surface. In some examples, signals recorded by pulsed-neutron logging tool 102 may be conducted to information handling system 122 by way of conveyance 118. Information handling system 122 may process the signals, and the information contained therein may be displayed for an operator to observe and stored for future processing and reference. Information handling system 122 may also contain an apparatus for supplying control signals and power to pulsed-neutron logging tool 102.

As noted above, systems and methods of the present disclosure may be implemented, at least in part, with information handling system 122. While shown at surface 134, information handling system 122 may also be located at another location that is remote from borehole 104. In examples information handling system 122 may be disposed on pulsed-neutron logging tool 102, which may allow for processing to occur downhole. Additionally, on or more information handling systems 122 may be utilized during measurement operations. In such examples, a first information handling system 122 may be at surface 134 and a second information handling system 122 may be disposed on pulsed-neutron logging tool 102 downhole. Information handling system 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 122 may be a processing unit 136, a network storage device, or any other suitable device and may vary in size, shape, performance, functionality, and price. Information handling system 122 may include random access memory (RAM), one or more processing resources such as a central processing unit (CPU) or hardware or software control logic, ROM, and/or other types of nonvolatile memory. Additional components of the information handling system 122 may include one or more disk drives, one or more network ports for communication with external devices as well as an input device 138 (e.g., keyboard, mouse, etc.) and video display 140. Information handling system 122 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 further illustrates a typical casing string 142 may extend from wellhead 126 at or above ground level to a selected depth within borehole 104. Casing string 142 may comprise a plurality of joints 144 or segments of casing string 142, each joint 144 being connected to the adjacent segments by a collar 146. There may be any number of layers in casing string 142. For example, a first casing 148 and a second casing 150. It should be noted that there may be any number of casing layers. FIG. 1 also illustrates a typical pipe string 152, which may be positioned inside of casing string 142 extending part of the distance down borehole 104. Pipe string 152 may be production tubing, tubing string, casing string, or other pipe disposed within casing string 142. Pipe string 152 may comprise concentric pipes. It should be noted that concentric pipes may be connected by collars 146. Pulsed-neutron logging tool 102 may be dimensioned so that it may be lowered into borehole 104 through pipe string 152, thus avoiding the difficulty and expense associated with pulling pipe string 152 out of borehole 104. In examples, cement (not illustrated) may be disposed on the outside of pipe string 152. Cement may further be disposed between pipe string 152 and casing string 142. It should be noted that cement may be disposed between any number of casings, for example between first casing 148 and second casing 150.

In logging systems, such as, for example, logging systems utilizing the pulsed-neutron logging tool 102, a digital telemetry system may be employed, wherein an electrical circuit may be used to both supply power to pulsed-neutron logging tool 102 and to transfer data between information handling system 122 and pulsed-neutron logging tool 102. A DC voltage may be provided to pulsed-neutron logging tool 102 by a power supply located above ground level, and data may be coupled to the DC power conductor by a baseband current pulse system. Alternatively, pulsed-neutron logging tool 102 may be powered by batteries located within the downhole tool assembly, and/or the data provided by pulsed-neutron logging tool 102 may be stored within the downhole tool assembly, rather than transmitted to the surface during logging (corrosion detection).

With continued reference to FIG. 1, wellhead 126 is described. Wellhead 126 allows for entry into borehole 104, such as the placement of pulsed-neutron logging tool 102 into pipe string 152. In examples, wellhead 126 may include a lubricator head 154 may comprise a lubricator head flange 156 which may be coupled to and sealed with lubricator body flange 158. Lubricator head 154 comprises sealing cartridge 160. Sealing cartridge 160 may be removable from lubricator head 154. Sealing cartridge 160 may be a container comprising a plurality of sealing elements 162 and lubricator cavities 164. Sealing elements 162 may comprise, but are not limited to, elastomeric materials, thermoplastic materials, thermosetting materials, composites thereof, or combinations thereof. Sealing elements 162 comprise an inner diameter to allow for pulsed-neutron logging tool 102, conveyance 118, wireline, coiled tubing, and/or the like to be disposed into borehole 104. Sealing elements 162 form a seal around conveyance 118 (or tubing if provided). Sealing elements 162 are selected such that the length of the diameter of the inner diameter is able to sufficiently seal around conveyance 118. In some example methods, a sealing cartridge 160 comprising a plurality of sealing elements 162 of one size may be removed if desired and exchanged for a different sealing cartridge 160 comprising a plurality of sealing elements 162 of a different size if desired. For example, if a wireline operation may utilize sealing elements 162 of a first size, upon completion of said wireline operation, the sealing cartridge 160 comprising the sealing elements 162 of a first size may be removed from lubricator head 154 and replaced with a second sealing cartridge 160 comprising sealing elements 162 of a second size to perform a subsequent operation, for example a tripping operation.

Figure 2:
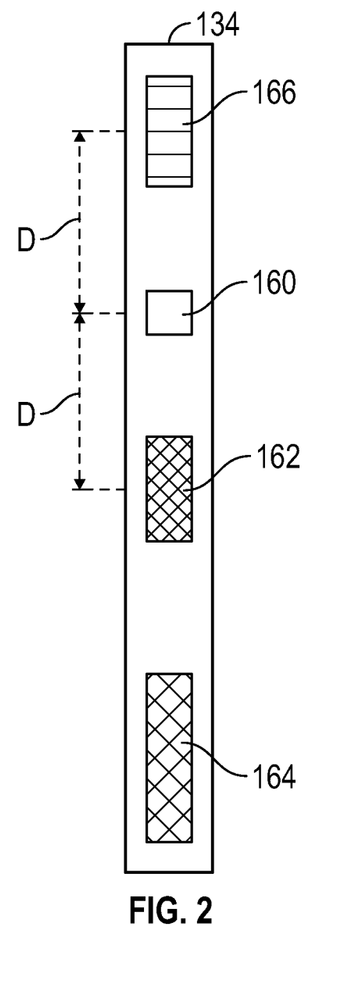
FIG. 2 is a diagram of illustrative embodiments of a pulsed-neutron logging tool

FIG. 2 shows a first illustrative setup of pulsed-neutron logging tool 102 having a pulsed neutron source 110 that is positioned equidistant from a gamma ray detector 166 and a first neutron detector 112. In examples, pulsed neutron source 110 may be replaced with a continuous neutron source such as Americium-Beryllium (Am—Be) chemical source. Pulsed-neutron logging tool 102 may also include a second neutron detector 114. The two neutron detectors 112 and 114 may be, respectively, termed the "near" and "far" neutron detectors. "Near" being the closest neutron detector to pulsed neutron source 110 and "far" being the furthest neutron detector from pulsed neutron source 110. Neutron detectors 112 and 114 may be designed to count thermal (around about 0.025 eV) and/or epithermal (between about 0.1 eV and 100 eV) neutrons. Suitable neutron detectors include Helium-3 (He-3) filled proportional counters, though other neutron counters may also be used. To improve tool performance, each neutron detector 112 and/or 114 may be implemented as a bank of individual detection devices. In accordance with standard neutron porosity tool measurement techniques, the ratio of far-to-near neutron detector counts is indicative of formation porosity.

With continued reference to FIG. 2, gamma ray detector 166 may be implemented as a scintillation crystal coupled to a photomultiplier tube. As with neutron detectors 112 and/or 114, gamma ray detector 166 may be implemented as a bank of individual detection devices whose results are aggregated. In FIG. 2, gamma ray detector 166 is "co-distant" with the near neutron detector 112, i.e., it is positioned at the same distance D from neutron source 110 as near neutron detector 112. As illustrated in FIG. 2, gamma ray detector 166 and first neutron detector 112 may be located in opposite directions from neutron source 110.

Figure 3A:
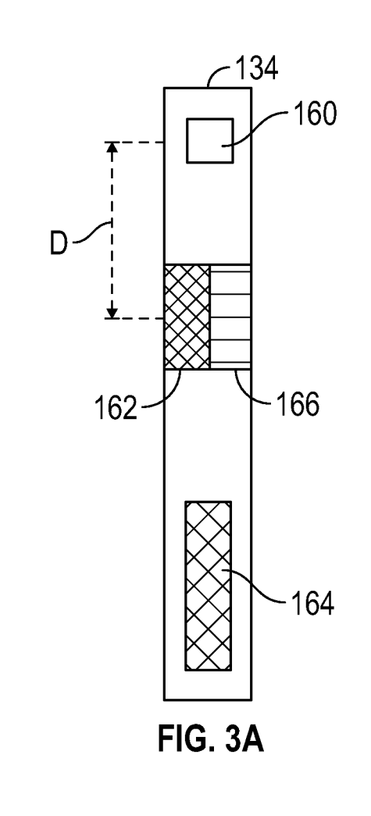
FIG. 3A-3B are diagrams of alternative embodiments of a pulsed-neutron logging tool.
Figure 3B:
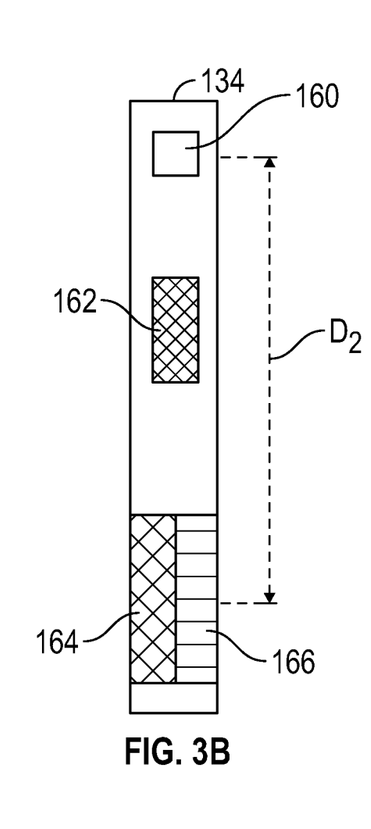

As discussed above, FIGS. 3A and 3B illustrate alternative embodiments of pulsed-neutron logging tool 102. FIG. 3A shows an alternative example in which pulsed-neutron logging tool 102 that has a gamma ray detector 166 and a near neutron detector 112 co-located, i.e., located side-by-side at the same distance D from the neutron source 110. FIG. 3B shows yet another alternative example in which pulsed-neutron logging tool 102 has a gamma ray detector 166 and a far neutron detector 114 co-located at a distance D2 from neutron source 110.

Multiple neutron detectors 112, 114 of pulsed-neutron logging tool 102, enable pulsed-neutron logging tool 102 to measure formation porosity using any of the existing multiple-spacing techniques. In addition, the presence of gamma ray detector 166 having a common distance from neutron source 110 with one of the neutron detectors 112 or 114, enables the measurement of borehole holdup, discussed below.

Figure 4:
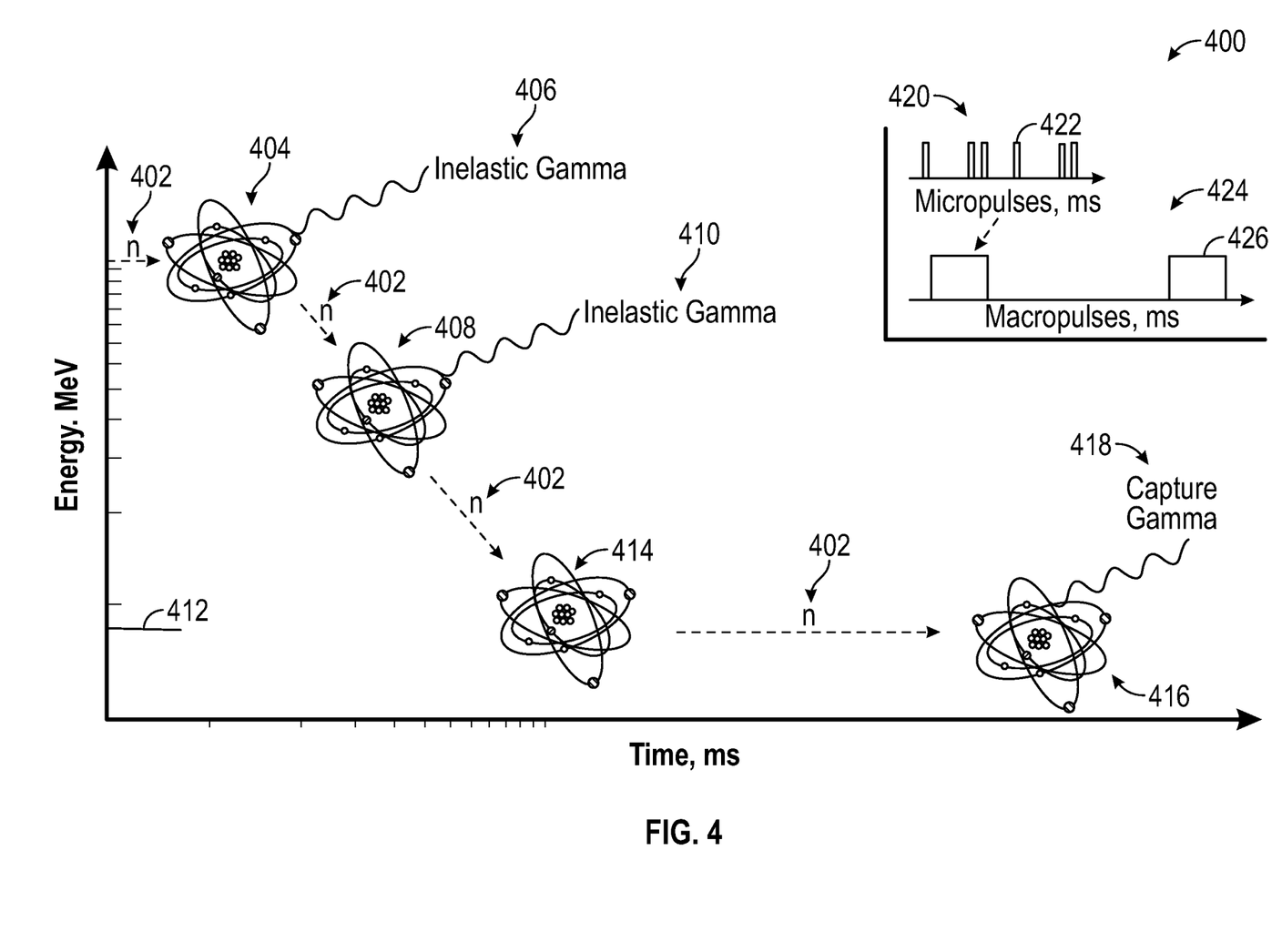
FIG. 4 illustrates the energy of a neutron as it interacts with one or more nuclei.

During measurement operations, neutrons emitted from neutron source 110 undergo weak electromagnetic scattering and/or nuclear absorption when interacting with matter. Scattering may either be elastic (n, n) or inelastic (n, n'). In an elastic interaction a fraction of the neutrons kinetic energy is transferred to the nucleus. An inelastic interaction is similar, except the nucleus undergoes an internal rearrangement. Additionally, neutrons may also undergo an absorption interaction. In most absorption interactions, elastic cross section is nearly constant, whereas the inelastic scattering cross section and absorption cross sections are proportional to the reciprocal of the neutrons speed. Referring to FIG. 4, heavy nuclei 420 have large and narrow resonances 422 that appears for neutrons in the eV range, whereas light nuclei 424 have broad and smaller resonances 426 that appear in the MeV.

FIG. 4 illustrates a graph 400 showing the energy of a neutron 402 as it interacts with one or more nuclei 408. As illustrated, neutron 402 may be traveling at a fast speed with high kinetic energy and interacts with nuclei 404, releasing inelastic gamma 406 and lowering the energy state of nuclei 404. After the interaction, neutron 402 contains too much energy to be absorbed, thus continues its path until it interacts with nuclei 408 releasing inelastic gamma 410 and again lowering its energy state again. After the interaction, neutron 402 has the kinetic energy close to target energy 412. Thus, when neutron 402 at target energy 412 interacts with nuclei 414 it will be captured. This interaction results in a rearranged nucleus 416 containing previously traveling nucleus 402 and an emitted capture gamma 418. Sensing these events with pulsed-neutron logging tool 102 using first neutron detector 112, second neutron detector 114, and/or gamma ray detector 166 (e.g., referring to FIG. 1) may allow for the identification of oil, gas, and/or water in borehole 104 (e.g., referring to FIG. 1).

Measurement operations, discussed above, take one more pulsed neutron log (PNL) measurements. PNL measurement may rely on characteristic nuclear excitation and relaxation process that is induced by high-energy particles, as discussed in FIG. 4. Interaction mechanisms of certain high-energy particles may also present a transient behavior for elemental analysis. Transient behavior of neutron diffusion may be closely related to the neutron capture cross section. Absorption cross section peaks when the neutron is moderated to the thermal energy of 0.025 eV (assuming 20° C. ambient temperature). By measuring the total gamma counts expelled from formation XX as a function of time, a characteristic decay constant of count rate may be found. Decay constants may correlate the PNL measurement to the total capture cross section. Inelastic measurement may be used carbon and oxygen analysis independent of water salinity. Neutron inelastic scatter only occurs when neutron energy is high enough to excite the target nucleus. Thus, during PNL measurement operations fast neutrons may be used. As discussed above, the excited target nucleus relaxes to its ground state by emitting characteristic gamma radiation, which may be recorded for PNL measurement operations. Phenomenologically, each measurement is unique for a set of petrophysical properties. Such properties may comprise borehole size and casing size, tool position and stand-off, borehole fluid content, casing and cement quality, formation lithology, formation porosity, formation oil saturation, holdup, and/or the like. Currently, only one or two petrophysical properties are isolated and correlated with PNL measurements via a physics-based algorithm so that the response function may be inverted to solve for those variables. Discussed below, a tool-data-centric multivariate inversion methodology is disclosed to iteratively solve for multiple variables of the borehole condition without the need for physics-based algorithm development when using a pulsed neutron logging tool.

Figure 5:
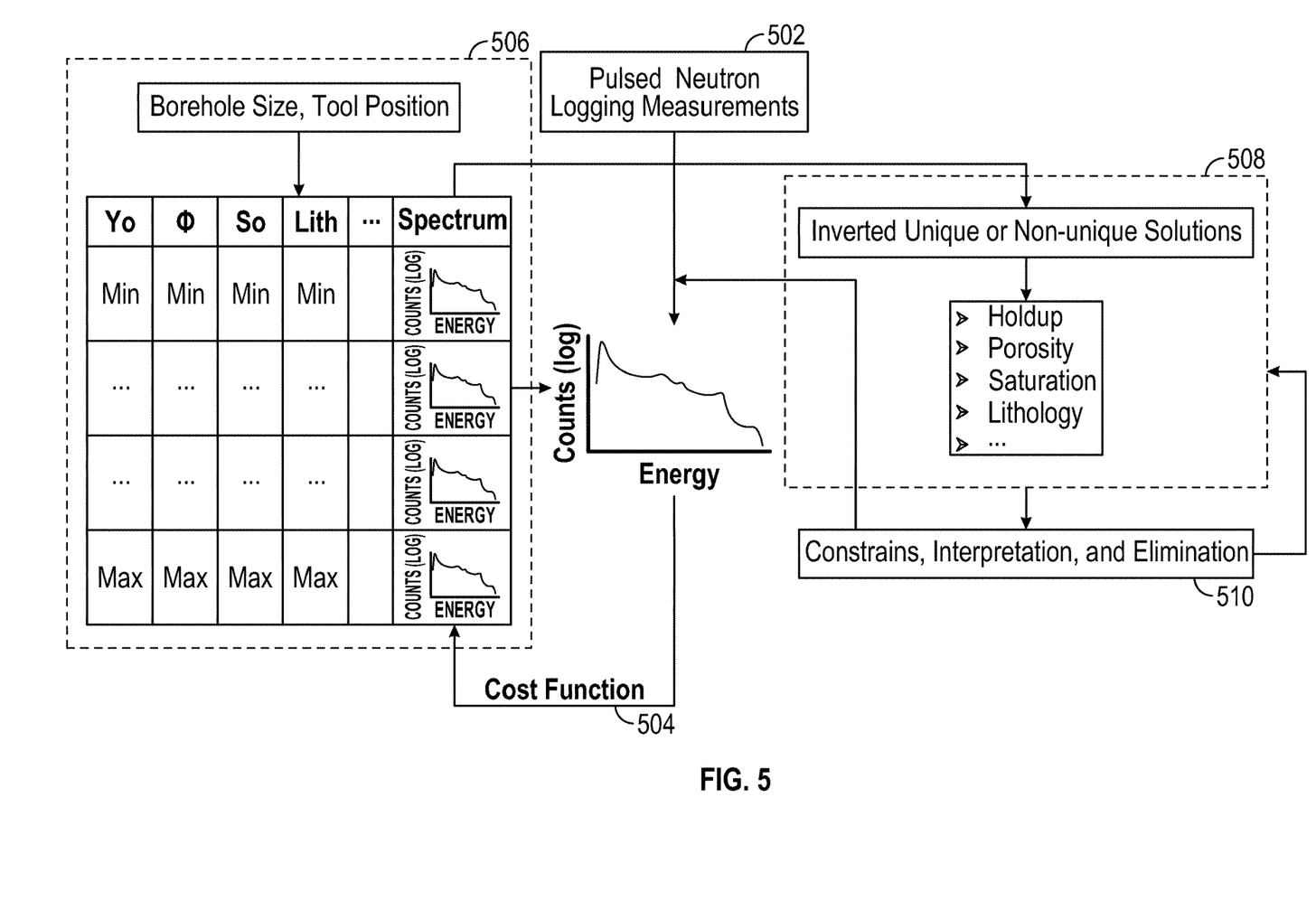
FIG. 5 illustrates a workflow identifying a plurality of petrophysical properties without a physics-based algorithm.

FIG. 5 illustrates workflow 500 for identifying a plurality of petrophysical properties without a physics-based algorithm in real-time. As used herein, the term "real-time: is defined as processing measurements at each depth before moving on to another depth for measurements. In examples, workflow 500 may be performed in second or minutes. Workflow 500 may be performed and operate on information handling system 122 (e.g., referring to FIG. 1). Additionally, workflow 500 may operate on a plurality of inflation handling systems 122 that are connected together in a network. Workflow 500 may begin with block 502, in which pulse neutron logging measurement operations are performed by a pulsed-neutron logging tool 102, as described above. (e.g., referring to FIG. 1). Pulsed-neutron logging tool 102 may measure a capture spectrum, an inelastic spectrum, and a transient evolution of capture spectrum during the measurement operations to form PNL measurements. PNL measurements may operates at identified timing gates. Capture spectrum is defined as sum of detector spectral response at longer timing gates after the neutron pulse. Inelastic spectrum is the sum of spectral response shorter timing gate after the neutron pulse. Transient decay is measured by plotting the capture gamma count rate as a function of time.

In block 504, a cost-function is constructed comparing the PNL measurements from the measurement operations to a database that comprises a plurality of simulated response functions from block 506. The databased may be populated to specific PNL measurement operations. For examples, based on logging conditions and borehole geometries, a set of Monte Carlo simulations (calibrated to the response of pulsed-neutron logging tool 102) may generated covering the minimum and maximum operating ranges of all the variables of interest. Variables of interest in the database may be populated by individual simulated responses for all petrophysical properties, such as, borehole size and casing size, tool position and standoff, borehole fluid content, casing and cement quality, formation lithology, formation porosity, formation oil saturation, holdup, and/or the like. Each petrophysical property has a range of simulated responses that may be analyzed individually to the PNL measurements from block 502 or combined with other petrophysical property responses and compared as a whole to the measurements from block 502. By minimizing the cost function in block 504, by an iterative multivariate inversion process, a unique or non-unique combination of solutions may be found. For unique or non-unique solution, there may be five variables to solve for PNL measurements to identify a variable of interest. For example, a unique solution is (x1, x2, x3, x4, x5) and non-unique solution is multiple sets of (x1, x2, x3, x4, x5). This is illustrated in Table 1, seen below.

In block 508, unique or non-unique solutions may be inverted to identify petrophysical properties. For non-unique combinations, petrophysical interpretation is conducted to exclude non-physical or non-logical solutions. First order derivative (of depth) may reveal discontinuous or improbable solutions that may be excluded readily. When the number of petrophysical properties being examined is large (i.e., greater than 2), the multivariate inversion process generally produces a non-unique solution. In other words, with reference to Table 1 below, the solution space is a combination of variables (or a range of values) in a non-unique pattern. By comparing the variable values at neighboring depth, certain solutions may be eliminated due to sudden discontinuity and non-physical behavior. As an example, a continuous parameter may be monitored by taking the first derivative, as a function of depth, as an elimination metric. Additionally, any variable in the solution space may be replaced by a known value (open hole data, or other type of measurement) to eliminate obvious non-probable answer.

With continued reference to FIG. 5, in block 510, constraints, geophysical interpretations, and/or eliminations may be utilized to constrain the solutions in block 508 to semi-unique solution space as a final interpretation of the petrophysical properties in block 508. For example, if the non-unique solution includes a combination of high porosity and anhydrite in a zone that known to have tight limestone, this answer can be rejected. Any non-unique solution that introduces a sharp non-petrophysical discontinuity in a property, that answer can be rejected as well. As illustrated in FIG. 5, constraints, geophysical interpretations, and/or eliminations from block 510 may be applied in block 508 or in block 502 to PNL measurements from PNL measurement operations.

Improvements over current technology are found in FIG. 5 and workflow 500. Specifically, workflow 500 relies on a data centric, and algorithm-less approach to solve multiple petrophysical properties using PNL measurement. Being data centric, workflow 500 focuses purely on the measured data without any modification or processing. Additionally, workflow 500 is algorithm-free. There is no need to establish a physics-based algorithm that correlates PNL measurement to a petrophysical property. Additionally, workflow 500 solves for multiple variables simultaneously, there is no limit of the number of variables. Workflow 500 offers the ability to improve the accuracy of the solution space by petrophysical interpretation and by using any known petrophysical variables. The methods and systems may include any of the various features disclosed herein, including one or more of the following statements.

Statement 1: A method may comprise disposing a pulsed-neutron logging tool into a borehole that is disposed in a formation, emitting a neutron from a neutron source on the pulsed-neutron logging tool into the formation, capturing one or more gammas expelled from formation in response to the neutron from the neutron source to form a plurality of pulsed neutron logging (PNL) measurements in a log, comparing the log to a database with a cost function to form a solution, and identifying a plurality of petrophysical properties based at least in part on the solution.

Statement 2. The method of statement 1, wherein the database is populated with a plurality of simulated data of the plurality of petrophysical properties.

Statement 3. The method of any preceding claim 1 or 2, wherein the solution is unique solution, and wherein the unique solution is a single solution that corresponds to one of the plurality of petrophysical properties.

Statement 4. The method of any preceding claims 1-3, wherein the solution is a non-unique solution, and wherein the non-unique solution is a plurality of solutions that correspond to one of the plurality of petrophysical properties.

Statement 5. The method of any preceding claims 1-4, further comprising adding a constraint, a geophysical interpretation, or an elimination to the unique or non-unique solution.

TABLE 1

| Depth | Solution Space | Uniqueness |
|---|---|---|
| 1 | $[X_{111}, X_{112}, X_{113}, X_{114}, \ldots]$ | Unique |
| 2 | $[\cancel{X_{211}, X_{212}, X_{213}, X_{214}, \ldots}][X_{221}, X_{222}, X_{223}, X_{224}, \ldots][\cancel{X_{231}, X_{232}, X_{233}, X_{234}, \ldots}]$ | Non-unique |
| … | … | |
| n | $[\cancel{X_{n11}, X_{n12}, X_{n13}, X_{n14}, \ldots}][X_{n21}, X_{n22}, X_{n23}, X_{n24}, \ldots]$ | Non-unique |

Statement 6. The method of any preceding claims 1-5, further comprising adding a constraint, a geophysical interpretation, or an elimination to the log.

Statement 7. The method of any preceding claims 1-6, wherein the database is populated using a Monte Carlo simulation to identify one or more variable of interest.

Statement 8. The method of statement 7, wherein the one or more variable of interest are a borehole size, a casing size, a tool position and standoff, a borehole fluid content, a casing and cement quality, a formation lithology, a formation porosity, a formation oil saturation, or a holdup.

Statement 9. The method of any preceding claims 1-7, wherein the comparing the log to a database with a cost function to form a unique or non-unique solution is performed in real-time.

Statement 10. The method of any preceding claim 1-7 or 9, wherein the petrophysical properties are a borehole size, a casing size, a tool position, a standoff, a borehole fluid content, a casing and cement quality, a formation lithology, a formation porosity, a formation oil saturation, or a holdup.

Statement 11. A system may comprise a pulsed-neutron logging tool. The pulsed-neutron logging tool may comprise a neutron source to emit a neutron into a formation and a neutron detector to capture one or more gammas expelled from the formation to the neutron from the neutron source. The system may further comprise an information handling system. The information handling system may form a log from a plurality of pulsed neutron logging (PNL) measurements based at least in part on the one or more gammas, compare the log to a database with a cost function to form a solution, and identify a plurality of petrophysical properties based at least in part on the solution.

Statement 12. The system of statement 11, wherein the database is populated with a plurality of simulated data of the plurality of petrophysical properties.

Statement 13. The system of any preceding statements 11 or 12, wherein the solution is a unique solution, and wherein the unique solution is a single solution that corresponds to one of the plurality of petrophysical properties.

Statement 14. The system of any preceding statements 11-13, wherein the solution is a non-unique solution, and wherein the non-unique solution is a plurality of solutions that correspond to one of the plurality of petrophysical properties.

Statement 15. The system of any preceding statements 11-14, wherein the information handling system further adds a constraint, a geophysical interpretation, or an elimination to the unique or non-unique solution.

Statement 16. The system of any preceding statements 11-15, wherein the information handling system further adds a constraint, a geophysical interpretation, or an elimination to the log.

Statement 17. The system of any preceding statements 11-16, wherein the database is populated with variables of interest utilizing a Monte Carlo simulation.

Statement 18. The system of statement 17, wherein the variables of interest are a borehole size, a casing size, a tool position and standoff, a borehole fluid content, a casing and cement quality, a formation lithology, a formation porosity, a formation oil saturation, or a holdup.

Statement 19. The system of any preceding statements 11-17, wherein the compare the log to a database with a cost function to form a unique or non-unique solution is performed in real-time.

The system of any preceding statements 11-17 or 19, wherein the petrophysical properties are a borehole size, a casing size, a tool position, a standoff, a borehole fluid content, a casing and cement quality, a formation lithology, a formation porosity, a formation oil saturation, or a holdup.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
    disposing a pulsed-neutron logging tool into a borehole that is disposed in a formation;
    emitting a neutron from a neutron source on the pulsed-neutron logging tool into the formation;
    capturing one or more gammas expelled from formation in response to the neutron from the neutron source to form a plurality of pulsed neutron logging (PNL) measurements in a log;
    comparing the log to a database with a cost function to form a solution, wherein the database is populated with simulated data, wherein the simulated data comprises one or more simulated PNL measurements; and identifying a plurality of petrophysical properties based at least in part on the solution.

2. The method of claim 1, wherein the solution is unique solution, and wherein the unique solution is a single solution that corresponds to one of the plurality of petrophysical properties.

3. The method of claim 1, wherein the solution is a non-unique solution, and wherein the non-unique solution is a plurality of solutions that correspond to one of the plurality of petrophysical properties.

4. The method of claim 1, further comprising adding a constraint, a geophysical interpretation, or an elimination to the unique or non-unique solution.

5. The method of claim 1, further comprising adding a constraint, a geophysical interpretation, or an elimination to the log.

6. The method of claim 1, wherein the database is populated using a Monte Carlo simulation to identify one or more variable of interest.

7. The method of claim 6, wherein the one or more variable of interest are a borehole size, a casing size, a tool position and standoff, a borehole fluid content, a casing and cement quality, a formation lithology, a formation porosity, a formation oil saturation, or a holdup.

8. The method of claim 1, wherein the comparing the log to a database with a cost function to form a unique or non-unique solution is performed in real-time.

9. The method of claim 1, wherein the petrophysical properties are a borehole size, a casing size, a tool position, a standoff, a borehole fluid content, a casing and cement quality, a formation lithology, a formation porosity, a formation oil saturation, or a holdup.

10. A system comprising:
a pulsed-neutron logging tool comprising:
a neutron source to emit a neutron into a formation; and
a neutron detector to capture one or more gammas expelled from the formation to the neutron from the neutron source; and
an information handling system to:
form a log from a plurality of pulsed neutron logging (PNL) measurements based at least in part on the one or more gammas;
compare the log to a database with a cost function to form a solution, wherein the database is populated with a plurality of simulated data of the plurality of petrophysical properties, wherein the simulated data is simulated PNL measurements; and
identify a plurality of petrophysical properties based at least in part on the solution.

11. The system of claim 10, wherein the solution is a unique solution, and wherein the unique solution is a single solution that corresponds to one of the plurality of petrophysical properties.

12. The system of claim 10, wherein the solution is a non-unique solution, and wherein the non-unique solution is a plurality of solutions that correspond to one of the plurality of petrophysical properties.

13. The system of claim 10, wherein the information handling system further adds a constraint, a geophysical interpretation, or an elimination to the unique or non-unique solution.

14. The system of claim 10, wherein the information handling system further adds a constraint, a geophysical interpretation, or an elimination to the log.

15. The system of claim 10, wherein the database is populated with variables of interest utilizing a Monte Carlo simulation.

16. The system of claim 15, wherein the variables of interest are a borehole size, a casing size, a tool position and standoff, a borehole fluid content, a casing and cement quality, a formation lithology, a formation porosity, a formation oil saturation, or a holdup.

17. The system of claim 10, wherein the compare the log to a database with a cost function to form a unique or non-unique solution is performed in real-time.

18. The system of claim 10, wherein the petrophysical properties are a borehole size, a casing size, a tool position, a standoff, a borehole fluid content, a casing and cement quality, a formation lithology, a formation porosity, a formation oil saturation, or a holdup.

* * * * *